(12) United States Patent
Torigoe et al.

(10) Patent No.: US 11,946,147 B2
(45) Date of Patent: *Apr. 2, 2024

(54) THERMAL BARRIER COATING, TURBINE MEMBER, GAS TURBINE, AND METHOD FOR PRODUCING THERMAL BARRIER COATING

(71) Applicant: MITSUBISHI HEAVY INDUSTRIES, LTD., Tokyo (JP)

(72) Inventors: Taiji Torigoe, Tokyo (JP); Yoshifumi Okajima, Tokyo (JP); Daisuke Kudo, Tokyo (JP); Masahiko Mega, Tokyo (JP); Shuji Tanigawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/979,971

(22) PCT Filed: Feb. 6, 2019

(86) PCT No.: PCT/JP2019/004158
§ 371 (c)(1),
(2) Date: Sep. 11, 2020

(87) PCT Pub. No.: WO2019/187663
PCT Pub. Date: Oct. 3, 2019

(65) Prior Publication Data
US 2021/0054492 A1 Feb. 25, 2021

(30) Foreign Application Priority Data
Mar. 26, 2018 (JP) .................. 2018-057716

(51) Int. Cl.
*F01D 5/28* (2006.01)
*B32B 15/04* (2006.01)
(Continued)

(52) U.S. Cl.
CPC ............... *C23C 4/04* (2013.01); *B32B 15/04* (2013.01); *C23C 4/02* (2013.01); *C23C 4/134* (2016.01);
(Continued)

(58) Field of Classification Search
CPC .................. C04B 2235/3246; F01D 5/288
See application file for complete search history.

(56) References Cited

U.S. PATENT DOCUMENTS

| 5,955,182 A | 9/1999 | Yasuda et al. |
| 7,833,586 B2 | 11/2010 | Margolies |

(Continued)

FOREIGN PATENT DOCUMENTS

| CN | 101004142 | 7/2007 |
| CN | 101081735 | 12/2007 |

(Continued)

OTHER PUBLICATIONS

Office Action dated Dec. 1, 2021 in corresponding Chinese Application No. 201980021203.X, with English-language translation.

(Continued)

*Primary Examiner* — Mark Ruthkosky
*Assistant Examiner* — Julia L Rummel
(74) *Attorney, Agent, or Firm* — Wenderoth, Lind & Ponack, L.L.P.

(57) ABSTRACT

A thermal barrier coating includes a bond coat layer deposited on a substrate, and a ceramic layer deposited on the bond coat layer. The ceramic layer includes a first layer having a porosity of 10% or more and 15% or less, and a second layer having a porosity of 0.5% or more and 9.0% or less and deposited on the first layer.

7 Claims, 15 Drawing Sheets

(51) Int. Cl.
  *C23C 4/02* (2006.01)
  *C23C 4/04* (2006.01)
  *C23C 4/134* (2016.01)
  *C23C 28/00* (2006.01)
  *F01D 1/00* (2006.01)
  *F01D 25/00* (2006.01)
  *F02C 7/00* (2006.01)

(52) U.S. Cl.
  CPC ............ *C23C 28/30* (2013.01); *C23C 28/32* (2013.01); *C23C 28/3215* (2013.01); *F01D 1/00* (2013.01); *F01D 5/28* (2013.01); *F01D 5/288* (2013.01); *F01D 25/00* (2013.01); *F02C 7/00* (2013.01); *B32B 2315/02* (2013.01); *C04B 2235/3246* (2013.01)

(56) References Cited

U.S. PATENT DOCUMENTS

| | | | |
|---|---|---|---|
| 9,822,437 | B2 | 11/2017 | Torigoe et al. |
| 10,808,308 | B2 * | 10/2020 | Tanigawa ................ C23C 4/134 |
| 2004/0110016 | A1 | 6/2004 | Hamaya et al. |
| 2007/0036997 | A1 | 2/2007 | Floyd et al. |
| 2007/0082131 | A1 | 4/2007 | Doesburg et al. |
| 2007/0172703 | A1 | 7/2007 | Freling et al. |
| 2007/0215283 | A1 | 9/2007 | Kobayashi |
| 2009/0176059 | A1 | 7/2009 | Namba et al. |
| 2009/0214825 | A1 | 8/2009 | Sun et al. |
| 2009/0311508 | A1 | 12/2009 | Stamm |
| 2011/0236657 | A1 * | 9/2011 | Feist .......................... C23C 4/11 428/411.1 |
| 2011/0300357 | A1 | 12/2011 | Witz et al. |
| 2012/0183790 | A1 | 7/2012 | Petorak et al. |
| 2013/0065076 | A1 | 3/2013 | Everhart |
| 2013/0095344 | A1 * | 4/2013 | Nagaraj ................ C04B 35/505 427/446 |
| 2013/0202912 | A1 * | 8/2013 | Torigoe .................... C23C 4/10 427/446 |
| 2014/0241937 | A1 * | 8/2014 | Hofener .................. C23C 4/067 427/446 |
| 2018/0135157 | A1 | 5/2018 | Jeong |
| 2019/0119804 | A1 | 4/2019 | Tanigawa et al. |

FOREIGN PATENT DOCUMENTS

| | | |
|---|---|---|
| CN | 101611171 | 12/2009 |
| CN | 102084020 | 6/2011 |
| CN | 102245810 | 11/2011 |
| CN | 102471863 | 5/2012 |
| CN | 103874580 | 6/2014 |
| EP | 2471974 | 2/2019 |
| JP | 59-96273 | 6/1984 |
| JP | 1-104756 | 4/1989 |
| JP | 7-243018 | 9/1995 |
| JP | 9-67662 | 3/1997 |
| JP | 2000-144365 | 5/2000 |
| JP | 2001-521990 | 11/2001 |
| JP | 2002-69607 | 3/2002 |
| JP | 2003-013259 | 1/2003 |
| JP | 2003-160852 | 6/2003 |
| JP | 2006-144061 | 6/2006 |
| JP | 2007-270245 | 10/2007 |
| JP | 2008-127614 | 6/2008 |
| JP | 2008-266724 | 11/2008 |
| JP | 2009-161848 | 7/2009 |
| JP | 4388466 | 12/2009 |
| JP | 2010-242223 | 10/2010 |
| JP | 2011-140693 | 7/2011 |
| JP | 2013-60661 | 4/2013 |
| JP | 2013-185202 | 9/2013 |
| JP | 5554488 | 7/2014 |
| JP | 5561733 | 7/2014 |
| JP | 5602156 | 10/2014 |
| JP | 5737996 | 6/2015 |
| JP | 2015-175315 | 10/2015 |
| JP | 2015-218379 | 12/2015 |
| JP | 2017-218635 | 12/2017 |
| KR | 10-2014-0129392 | 11/2014 |
| WO | 99/23274 | 5/1999 |
| WO | 2013/103425 | 7/2013 |

OTHER PUBLICATIONS

International Search Report dated Apr. 23, 2019 in corresponding International (PCT) Patent Application No. PCT/JP2019/004158.
International Preliminary Report on Patentability dated Oct. 8, 2020 in corresponding International (PCT) Patent Application No. PCT/JP2019/004158, with English Translation.
Extended European Search Report dated Nov. 6, 2020 in corresponding European Patent Application No. 19776808.8.
Office Action dated Feb. 1, 2022 in counterpart JP Application No. 2018-057716, with machine translation.
Office Action dated Aug. 1, 2022 in corresponding Korean Patent Application No. 10-2020-7027049, with Machine Translation.
Office Action dated Jun. 14, 2022 in counterpart Japanese Patent Application No. 2018-057716, with Machine Translation.
Saral et al., Thermal cycle properties of plasma sprayed YSZ/Al2O3 thermal barrier coatings, Oct. 2009, Surface Engineering, vol. 20, Issue 7, pp. 541-547.
Zhu et al., Thin Yttria-Stabilized Zirconia Coatings Deposited by Low-Energy Plasma Spraying Under Very Low Pressure Condition, Sep. 2011, Journal of Thermal Spray Technology, vol. 20, Issue 5, pp. 1118-1124.
International Search Report dated Jul. 11, 2018 in International (PCT) Application No. PCT/JP2017/020912.
Written Opinion of the International Searching Authority dated Jul. 11, 2017 in International (PCT) Application No. PCT/JP2017/020912, with English-language translation.
Oguma et al., "Development of Advanced Materials and Manufacturing Technology for High-efficiency Gas Turbine", Mitsubishi Juko Giho Shinseihin-Shingijutsu Tokushu, 2015, vol. 52, No. 4, pp. 5-14.

* cited by examiner

THERMAL BARRIER COATING, TURBINE MEMBER, GAS TURBINE, AND METHOD FOR PRODUCING THERMAL BARRIER COATING

TECHNICAL FIELD

The present disclosure relates to a thermal barrier coating, a turbine member, a gas turbine, and a method for producing a thermal barrier coating.

BACKGROUND

In a field of industrial gas turbines, a thermal barrier coating (TBC) is known which is capable of reducing thermal load to a heat resistant member without changing the shape of a blade or a cooling structure provided to the blade.

For example, Patent Document 1 discloses a method for producing a thermal barrier coating, including thermally spraying spray particles having a predetermined particle size distribution to form a ceramic layer, in order to achieve both high thermal barrier property and thermal cycling durability.

CITATION LIST

Patent Literature

Patent Document 1: JP5602156B

SUMMARY

Problems to be Solved

In an oil-fired gas turbine using petroleum as fuel, it is known that corrosive substances contained in combustion gas may infiltrate into a ceramic layer of a thermal barrier coating through pores of the ceramic layer and deteriorate the ceramic layer. Therefore, corrosive substances contained in combustion gas may reduce the durability of the thermal barrier coating.

It is thus conceivable to prevent corrosive substances from infiltrating into the ceramic layer by, for instance, reducing the porosity of the ceramic layer of the thermal barrier coating. However, when the porosity of the ceramic layer is reduced, the thermal conductivity of the ceramic layer increases, so that the thermal barrier property of the thermal barrier coating decreases.

In view of the above, an object of at least one embodiment of the present invention is to improve the durability of the thermal barrier coating.

Solution to the Problems (1) A thermal barrier coating according to at least one embodiment of the present invention comprises: a bond coat layer deposited on a substrate, and a ceramic layer deposited on the bond coat layer, and the ceramic layer includes a first layer having a porosity of 10% or more and 15% or less, and a second layer having a porosity of 0.5% or more and 9.0% or less and deposited on the first layer.

With the above configuration (1), since the ceramic layer includes the first layer having a porosity of 10% or more and 15% or less and the second layer having a porosity of 0.5% or more and 9.0% or less, the first layer suppresses an increase in thermal conductivity of the ceramic layer, and the second layer suppresses infiltration of corrosive substances.

More specifically, since the thermal conductivity of the first layer increases with a decrease in porosity of the first layer, the thermal barrier performance may be insufficient when the porosity of the first layer is less than 10%. Further, since the adhesion with the bond coat layer tends to decrease with an increase in porosity of the first layer, the adhesion with the bond coat layer may be insufficient when the porosity of the first layer exceeds 15%.

In this regard, with the above configuration (1), since the porosity of the first layer is 10% or more and 15% or less, it is possible to suppress an increase in thermal conductivity of the first layer while ensuring the durability of the first layer.

In order to obtain the second layer having a porosity of less than 0.5%, a large-scale apparatus including a chamber is required, such as an apparatus for coating by the chemical vapor deposition method, for example. Further, when the porosity of the second layer exceeds 9%, the effect of suppressing infiltration of corrosive substances by the second layer may be insufficient.

In this regard, with the above configuration (1), since the porosity of the second layer is 0.5% or more and 9.0% or less, it is possible to easily suppress infiltration of corrosive substances.

Thus, with the above configuration (1), the durability of the thermal barrier coating can be improved even in an environment where the combustion gas contains corrosive substances.

(2) In some embodiments, in the above configuration (1), the porosity of the second layer is 1.0% or more and 7.5% or less.

The porosity of the second layer can be reduced to 0.5% by appropriately setting the formation conditions of the second layer. However, the formation conditions of the second layer can be relaxed by increasing the lower limit value of the porosity of the second layer to 1.0%. Further, the effect of suppressing infiltration of corrosive substances increases with a decrease in porosity of the second layer. As a result of intensive studies by the present inventors, they have found that the effect of suppressing infiltration of corrosive substances further increases when the porosity of the second layer is 7.5% or less. Therefore, the upper limit value of the porosity of the second layer may be 7.5%.

In this regard, with the above configuration (2), since the porosity of the second layer is 1.0% or more and 7.5% or less, it is possible to relax the formation conditions of the second layer and improve the effect of suppressing infiltration of corrosive substances.

(3) In some embodiments, in the above configuration (1), the first layer has no vertical cracks extending along a thickness direction of the first layer, and the porosity of the second layer is 0.5% or more and less than 4.0%.

When the thermal barrier coating is heated together with the substrate, the dimensional change due to thermal expansion is more pronounced on the substrate than on the first layer. Accordingly, when the first layer has vertical cracks extending in the thickness direction thereof, the spacing of gaps of the vertical cracks in the first layer expands with heating of the thermal barrier coating and the substrate. Therefore, when the first layer has vertical cracks extending in the thickness direction thereof, and the second layer is formed on the first layer, with heating of the thermal barrier coating and the substrate, stress that extends the second layer in the plane direction is applied to the second layer. Accordingly, when the porosity of the second layer is less than 4.0%, cracks may easily occur in the second layer due to thermal expansion of the first layer, and corrosive substances may infiltrate through the cracks formed in the second layer. Thus, it is difficult to set the porosity of the second layer to less than 4.0%. However, it is desirable to reduce the porosity of the second layer in terms of suppressing infiltration of corrosive substances.

In this regard, with the above configuration (3), since the first layer has no vertical cracks extending in the thickness direction thereof, the dimensional change due to thermal expansion of the first layer is reduced compared with the case where vertical cracks are introduced. It is thus possible to reduce the occurrence of cracks in the second layer even when the porosity of the second layer is less than 4.0%. Consequently, since the porosity of the second layer can be reduced while suppressing the occurrence of cracks in the second layer, it is possible to improve the effect of suppressing infiltration of corrosive substances by the second layer.

(4) In some embodiments, in any one of the above configurations (1) to (3), the second layer is formed by thermally spraying first spray particles having a particle size distribution with a D10 particle size of 30 μm or more and 40 μm or less, a D50 particle size of 40 μm or more and 60 μm or less, and a D90 particle size of 70 μm or more and 80 μm or less.

Conventionally, a ceramic layer is formed by using spray particles having a particle size distribution close to normal distribution with an average particle size ranging from 10 μm to 150 μm, generally 10 μm to 100 μm.

As a result of intensive studies, the present inventors have found that when the ceramic layer is formed by using spray particles which contains small-size particles at a smaller proportion than in conventional spray particles having the above particle size distribution and mainly contains relatively large particles, the porosity of the ceramic layer increases, so that the thermal barrier property of the ceramic layer is improved. Further, the present inventors have found that when the ceramic layer is formed by using spray particles containing small-size particles at a smaller proportion than in conventional spray particles and mainly containing relatively large particles as described above, the occurrence of micro-defects (lamellar defects) which may expand starting from pores is suppressed, so that the thermal cycling durability is improved.

More specifically, the present inventors have found that when D10 particle size is increased compared with conventional spray particles having the above particle size distribution to reduce the proportion of small-size particles in the spray particles, the thermal barrier property of the ceramic layer and the thermal cycling durability are improved.

Further, as a result of intensive studies, the present inventors have found that when the proportion of large-size particles in the above-described spray particles, which contains small-size particles at a smaller proportion than in conventional spray particles and mainly contains relatively large particles, is further reduced, the porosity of the ceramic layer is reduced while ensuring the thermal cycling durability.

More specifically, as a result of intensive studies, the present inventors have found that when first spray particles having a particle size distribution with a D10 particle size of 30 μm or more and 40 μm or less, a D50 particle size of 40 μm or more and 60 μm or less, and a D90 particle size of 70 μm or more and 80 μm or less are used for forming the second layer, the porosity of the second layer is reduced, so that infiltration of corrosive substances is suppressed. Further, they have found that, using the first spray particles, the occurrence of micro-defects (lamellar defects) which may expand starting from pores in the second layer is suppressed, so that the thermal cycling durability is improved. In other words, when the first spray particles are used, the porosity of the second layer can be 0.5% or less and 9.0 or less.

Thus, when the second layer is formed by thermally spraying the first spray particles described in (4), it is possible to suppress infiltration of corrosive substances by the second layer while ensuing the durability of the second layer.

(5) In some embodiments, in the above configuration (4), the first layer is formed by thermally spraying second spray particles having a particle size distribution with a D10 particle size of 40 μm or more and 50 μm or less, a D50 particle size of 60 μm or more and 70 μm or less, and a D90 particle size of 80 μm or more and 100 μm or less.

As described above, as a result of intensive studies, the present inventors have found that when the ceramic layer is formed by using spray particles containing small-size particles at a smaller proportion than in conventional spray particles and mainly containing relatively large particles, the porosity of the ceramic layer increases, so that the thermal barrier property of the ceramic layer is improved, and further, the occurrence of lamellar defects is suppressed, so that the thermal cycling durability is improved.

Thus, when second spray particles, such as the second spray particles described in (5), having a particle size distribution with a D10 particle size of 40 μm or more and 50 μm or less, a D50 particle size of 60 μm or more and 70 μm or less, and a D90 particle size of 80 μm or more and 100 μm or less are used for forming the first layer, the porosity of the first layer can be 10% or more and 15% or less, so that it is possible to improve the thermal barrier property of the first layer while ensuring the durability of the first layer.

(6) In some embodiments, in the above configuration (5), a ratio of the D10 particle size of the first spray particles to the D10 particle size of the second spray particles is larger than a ratio of the D50 particle size of the first spray particles to the D50 particle size of the second spray particles and a ratio of the D90 particle size of the first spray particles to the D90 particle size of the second spray particles.

As a result of intensive studies by the present inventors, they have found that the thermal cycling durability of the layer formed by thermal spraying is improved by increasing D10 particle size, as described above. In other words, it has been found that the thermal cycling durability of the layer formed by thermal spraying is reduced by decreasing D10 particle size. Further, as a result of intensive studies by the present inventors, they have found that the porosity of the layer formed by thermal spraying is reduced by decreasing the proportion of large-size particles in the spray particles, as described above.

Thus, it is preferred that while preventing the D10 particle size of the first spray particles from becoming too small relative to the D10 particle size of the second spray particles in view of thermal cycling durability, the D50 particle size and D90 particle size of the first spray particles are reduced relative to the D50 particle size and D90 particle size of the second spray particles in view of corrosive substance infiltration suppression by the second layer.

In this regard, with the above configuration (6), since the ratio of the D10 particle size of the first spray particles to the D10 particle size of the second spray particles is larger than the ratio of the D50 particle size of the first spray particles to the D50 particle size of the second spray particles and the ratio of the D90 particle size of the first spray particles to the D90 particle size of the second spray particles, it is possible to suppress infiltration of corrosive substances by the second layer while ensuring the durability of the second layer.

(7) In some embodiments, in any one of the above configurations (1) to (6), the first layer and the second layer are thermal spray layers formed by atmospheric plasma spraying.

For instance, when the first layer and the second layer are formed by chemical vapor deposition or physical vapor deposition, or when the first layer and the second layer are formed by low pressure plasma spraying, a large apparatus equipped with a chamber is required, so that the equipment cost becomes expensive, and further, these methods require many steps including preparation, for example, setup.

In this regard, with the above configuration (7), since the first layer and the second layer are formed by atmospheric plasma spraying with a simple apparatus configuration, it is possible to reduce the equipment cost and the number of steps including preparation such as setup and shorten the time necessary for steps, compared with the case where the first layer and the second layer are formed by, for example, chemical vapor deposition, physical vapor deposition, or low pressure plasma spraying.

(8) In some embodiments, in any one of the above configurations (1) to (7), a thickness of the second layer is 10% or more and 100% or less of a thickness of the first layer.

When the thickness of the second layer is less than 10% of the thickness of the first layer, for instance, the thickness of the second layer is less than 0.05 mm (50 μm) when the thickness of the first layer is 0.5 mm. This may cause penetration of pores in the second layer if it has a locally thin portion. On the other hand, when the thickness of the second layer exceeds 100% of the thickness of the first layer, since the second layer has a smaller porosity and thus a higher thermal conductivity than the first layer, the thermal barrier property of the ceramic layer may become insufficient.

In this regard, with the above configuration (8), since the thickness of the second layer is 10% or more and 100% or less of the thickness of the first layer, it is possible to suppress infiltration of corrosive substances while ensuring the thermal barrier property.

(9) In some embodiments, in any one of the above configurations (1) to (8), the second layer is composed of the same material as the first layer.

With the above configuration (9), since the second layer is composed of the same material as the first layer, significant difference in film-forming conditions between the first layer and the second layer is eliminated because of the materials with the same composition, and the adhesion of the interface between the first layer and the second layer is increased.

Further, since the first layer and the second layer have the same coefficient of linear expansion and phase stability under a high-temperature environment, it is possible to reduce quality degradation of the thermal barrier coating under a high-temperature environment.

(10) A turbine member according to at least one embodiment of the present invention comprises the thermal barrier coating with any one of the above configurations (1) to (9). Thus, it is possible to improve the durability of the turbine member even in an environment where the combustion gas contains corrosive substances.

(11) A gas turbine according to at least one embodiment of the present invention comprises the turbine member with the above configuration (10). Thus, it is possible to improve the durability of the turbine member of the gas turbine even in an environment where the combustion gas contains corrosive substances.

(12) A method for producing a thermal barrier coating according to at least one embodiment of the present invention comprises: depositing a bond coat layer on a substrate; depositing a first layer on the bond coat layer; and depositing a second layer on the first layer by thermally spraying spray particles having a particle size distribution with a D10 particle size of 30 μm or more and 40 μm or less, a D50 particle size of 40 μm or more and 60 μm or less, and a D90 particle size of 70 μm or more and 80 μm or less.

With the above method (12), the second layer having a porosity of 0.5% or more and 9.0% or less is formed in the step of depositing the second layer by thermally spraying spray particles having a particle size distribution with a D10 particle size of 30 μm or more and 40 μm or less, a D50 particle size of 40 μm or more and 60 μm or less, and a D90 particle size of 70 μm or more and 80 μm or less. Thus, it is possible to suppress infiltration of corrosive substances by the second layer.

Thus, with the above method (12), the durability of the thermal barrier coating can be improved even in an environment where the combustion gas contains corrosive substances.

(13) In some embodiments, in the above method (12), the depositing of the first layer includes depositing the first layer on the bond coat layer by thermally spraying spray particles having a particle size distribution with a D10 particle size of 40 μm or more and 50 μm or less, a D50 particle size of 60 μm or more and 70 μm or less, and a D90 particle size of 80 μm or more and 100 μm or less.

With the above method (13), the first layer having a porosity of 10% or more and 15% or less is formed in the step of depositing the first layer by thermally spraying spray particles having a particle size distribution with a D10 particle size of 40 μm or more and 50 μm or less, a D50 particle size of 60 μm or more and 70 μm or less, and a D90 particle size of 80 μm or more and 100 μm or less. Thus, it is possible to suppress an increase in thermal conductivity of the first layer while ensuring the durability of the first layer.

(14) A method for producing a thermal barrier coating according to at least one embodiment of the present invention comprises: depositing a second layer, on a first layer of an existing coating layer having a bond coat layer deposed on a substrate and the first layer deposited on the bond coat layer, by thermally spraying spray particles having a particle size distribution with a D10 particle size of 30 μm or more and 40 μm or less, a D50 particle size of 40 μm or more and 60 μm or less, and a D90 particle size of 70 μm or more and 80 μm or less.

With the above method (14), the second layer having a porosity of 0.5% or more and 9.0% or less is formed on the existing coating layer having the bond coat layer and the first layer deposited on the bond coat layer by the step of depositing the second layer. Thus, it is possible to suppress infiltration of corrosive substances by the second layer. Thus, the durability of the existing coating layer can be improved even in an environment where the combustion gas contains corrosive substances.

(15) A method for producing a thermal barrier coating according to at least one embodiment of the present invention comprises: removing a second layer from an existing thermal barrier coating layer having a bond coat layer deposited on a substrate, a first layer deposited on the bond coat layer, and the second layer deposited on the first layer; and depositing a second layer, on the first layer of the existing thermal barrier coating layer from which the second layer has been removed, by thermally spraying spray particles having a particle size distribution with a D10 particle size of 30 μm or more and 40 μm or less, a D50 particle size of 40 μm or more and 60 μm or less, and a D90 particle size of 70 μm or more and 80 μm or less.

With the above method (15), the second layer is removed from the existing thermal barrier coating layer, and the second layer having a porosity of 0.5% or more and 9.0% or less is newly formed. Thus, it is possible to newly deposit the second layer, for instance, when the second layer of the existing thermal barrier coating layer deteriorates. Thus, it is possible to suppress infiltration of corrosive substances by the newly deposited second layer. Thus, the durability of the existing thermal barrier coating layer can be improved even in an environment where the combustion gas contains corrosive substances.

Advantageous Effects

According to at least one embodiment of the present invention, it is possible to improve the durability of the thermal barrier coating.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Thermal Barrier Coating)

Figure 1:
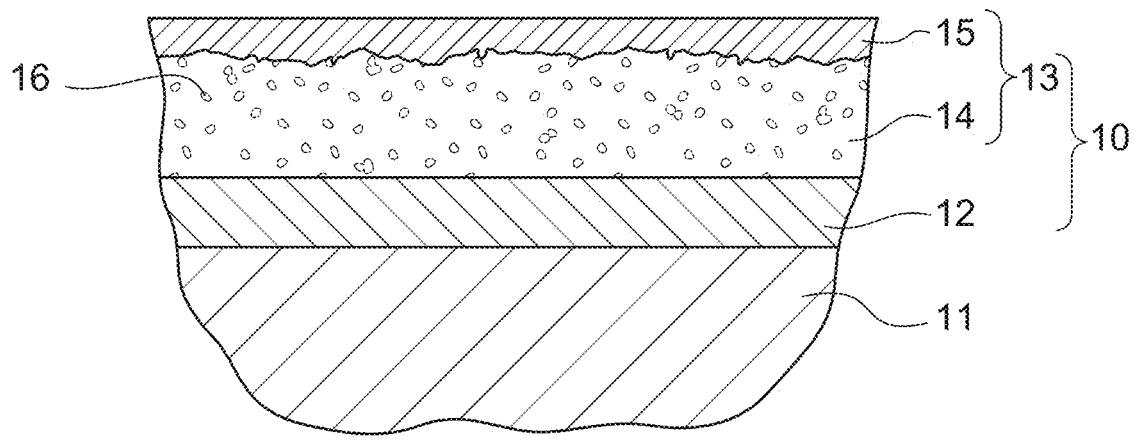
FIG. 1 is a schematic cross-sectional view of a turbine member having a thermal barrier coating according to an embodiment.

FIG. 1 is a schematic cross-sectional view of a turbine member having a thermal barrier coating according to an embodiment. In some embodiments, a metallic bond layer (bond coat layer) 12 and a ceramic layer 13 are sequentially formed as a thermal barrier coating on a heat resistant substrate (substrate) 11 such as rotor blades and stator vanes of a turbine. In other words, as shown in FIG. 1, in some embodiments, a thermal barrier coating (TBC) layer 10 includes a bond coat layer 12 and a ceramic layer 13.

The bond coat layer 12 is composed of MCrAlY alloy, where M represents a metallic element such as Ni, Co, or Fe or a combination of two or more of them.

In some embodiments shown in FIG. 1, the ceramic layer 13 includes a first layer 14 and a second layer 15. Each of the first layer 14 and the second layer 15 in some embodiments is composed of YbSZ (ytterbium-stabilized zirconia), YSZ (yttria-stabilized zirconia), $SmYbZr_2O_7$, DySZ (disprosia-stabilized zirconia), or ErSZ (erbia-stabilized zirconia), for example.

In some embodiments shown in FIG. 1, the second layer 15 is composed of the same material as the first layer 14.

Thus, since the second layer 15 is composed of the same material as the first layer 14, significant difference in film-forming conditions between the first layer 14 and the second layer 15 is eliminated because of the materials with the same composition, and the adhesion of the interface between the first layer 14 and the second layer 15 is increased. Further, since the first layer 14 and the second layer 15 have the same coefficient of linear expansion and phase stability under a high-temperature environment, it is possible to reduce quality degradation of the thermal barrier coating layer 10 under a high-temperature environment.

In some embodiments shown in FIG. 1, the first layer 14 has a porous structure including many pores 16. Here, "many" means that the porosity (vol %) is higher than the second layer 15. The porosity and thickness of the first layer 14 are appropriately set according to the required thermal conductivity. In some embodiments, the porosity of the first layer 14 is 10% or more and 15% or less, as described below.

The porosity is defined as a percentage of the area of pores in a cross-section of the thermal barrier coating layer 10, i.e., a value obtained by dividing the area of pores by the area of the cross-section and then multiplying by 100. Specifically, the porosity is determined as follows: For instance, the cross-section of the thermal barrier coating layer 10 is polished to capture an image observed by an optical microscope. Then, the captured image (for example, FIG. 16) is binarized so that the pore part (void part) and the film part can be separately extracted. Then, the area of the pore part and the area of the film part are calculated from the binary image (for example, FIG. 17), and the area of the pore part is divided by the sum of the areas of the pore and film parts, i.e., the area of the cross-section, to calculate the porosity. Alternatively, the area of the pore part and the area of the cross-section are calculated from the binary image, and the area of the pore part is divided by the area of the cross-section to calculate the porosity. When calculating the porosity of the first layer 14, the porosity of the first layer 14 is determined by dividing the area of the pores 16 in the first layer 14 as calculated above by the area of the cross-section of the first layer 14.

Figure 16:
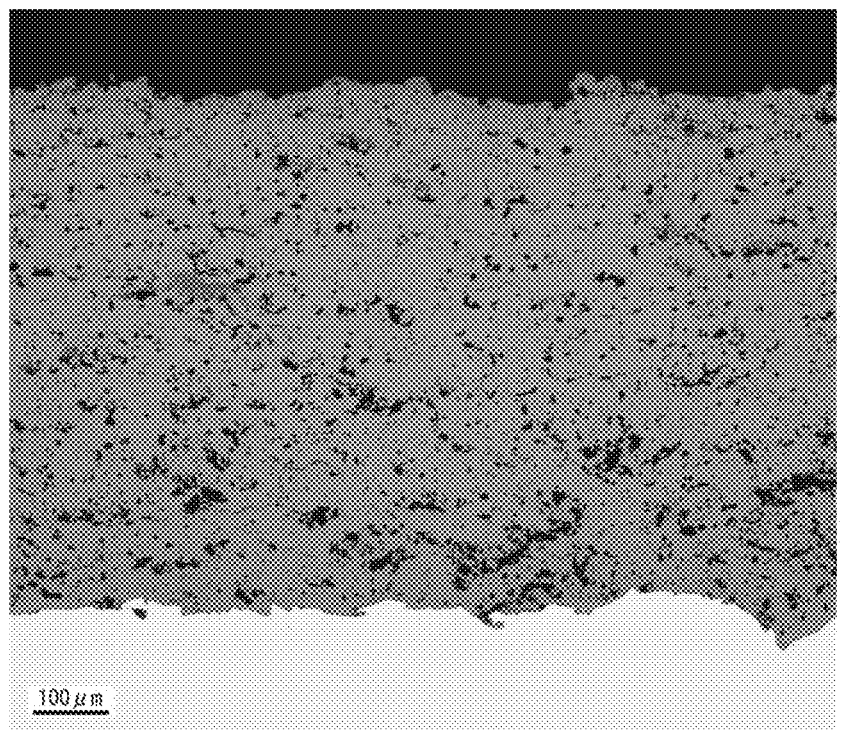
FIG. 16 is an exemplary optical micrograph of a film cross-section used for calculating the porosity of a thermal barrier coating layer.
Figure 17:
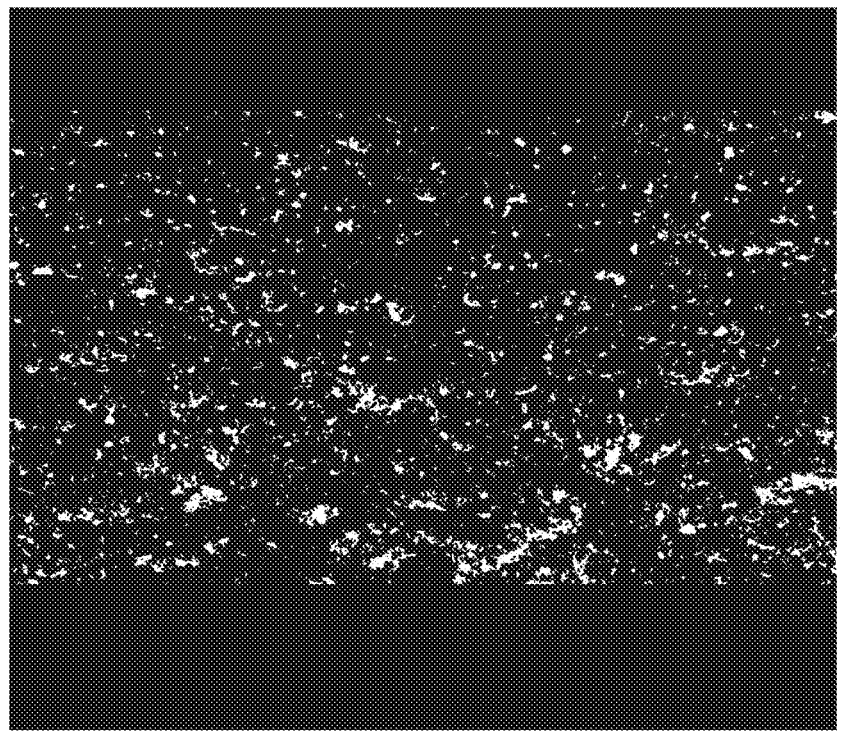
FIG. 17 is an exemplary binary image of an optical micrograph of a film cross-section used for calculating the porosity of a thermal barrier coating layer.

FIG. 16 is an exemplary optical micrograph of a film cross-section used for calculating the porosity of the thermal barrier coating layer. FIG. 17 is an exemplary binary image of an optical micrograph of a film cross-section used for calculating the porosity of the thermal barrier coating layer.

In some embodiments shown in FIG. 1, the second layer 15 has a denser structure than the first layer 14 and is formed on the first layer 14. Here, the "dense structure" means a structure having a porosity that can suppress infiltration of corrosive components (corrosive substances) into the first layer 14, the bond coat layer 12, and the heat resistant substrate 11 as described later.

The porosity and thickness of the second layer 15 are appropriately set, taking into account the effect of suppressing infiltration of corrosive substances (hereafter referred to as infiltration suppression effect) and the thermal conductivity required for the ceramic layer 13. In some embodiments, as described later, the porosity of the second layer 15 is 0.5% or more and 9.0% or less.

The thickness of the ceramic layer 13 may be, but not limited to, 0.1 mm or more and 1 mm or less.

In other words, the thermal barrier coating layer 10 according to some embodiments includes the bond coat layer 12 deposited on the heat resistant substrate 11 and the ceramic layer 13 deposited on the bond coat layer 12. The ceramic layer 13 includes the first layer 14 having a porosity of 10% or more and 15% or less and the second layer 15 having a porosity of 0.5% or more and 9.0% or less and deposited on the first layer 14.

In the thermal barrier coating layer 10 according to some embodiments, since the ceramic layer 13 includes the first layer 14 having a porosity of 10% or more and 15% or less and the second layer 15 having a porosity of 0.5% or more and 9.0% or less, the first layer 14 suppresses an increase in thermal conductivity of the ceramic layer 13, and the second layer 15 suppresses infiltration of corrosive substances.

More specifically, since the thermal conductivity of the first layer 14 increases with a decrease in porosity of the first layer 14, the thermal barrier performance may be insufficient when the porosity of the first layer 14 is less than 10%. Further, since the adhesion with the bond coat layer 12 tends to decrease with an increase in porosity of the first layer 14, the adhesion with the bond coat layer 12 may be insufficient when the porosity of the first layer 14 exceeds 15%.

In this regard, in the thermal barrier coating layer 10 according to some embodiments, since the porosity of the first layer 14 is 10% or more and 15% or less, it is possible to suppress an increase in thermal conductivity of the first layer 14 while ensuring the durability of the first layer 14.

In order to obtain the second layer 15 having a porosity of less than 0.5%, a large-scale apparatus including a chamber is required, such as an apparatus for coating by the chemical vapor deposition method, for example. Further, when the porosity of the second layer 15 exceeds 9%, the effect of suppressing infiltration of corrosive substances by the second layer 15 may be insufficient.

In this regard, in the thermal barrier coating layer 10 according to some embodiments, since the porosity of the second layer 15 is 0.5% or more and 9.0% or less, it is possible to easily suppress infiltration of corrosive substances.

Thus, the thermal barrier coating layer 10 according to some embodiments can improve the durability of the thermal barrier coating layer 10 even in an environment where the combustion gas contains corrosive substances.

As described later, when the second layer 15 is formed by thermal spraying such as atmospheric plasma spraying, the porosity of the second layer 15 can be reduced to 0.5% by appropriately setting the formation conditions of the second layer 15 such as spray distance and spray temperature. However, the thermal spray conditions can be relaxed by increasing the lower limit value of the porosity of the second layer 15 to 1.0%. Therefore, the lower limit value of the porosity of the second layer 15 may be 1.0%.

Further, the effect of suppressing infiltration of corrosive substances increases with a decrease in porosity of the second layer 15. As a result of intensive studies by the inventors, they have found that the effect of suppressing infiltration of corrosive substances further increases when the porosity of the second layer 15 is 7.5% or less. Therefore, the upper limit value of the porosity of the second layer 15 may be 7.5%.

(Thermal Barrier Coating Layer 10 According to an Embodiment)

When the thermal barrier coating layer 10 is heated together with the heat resistant substrate 11, the dimensional change due to thermal expansion is more pronounced on the heat resistant substrate 11 than on the ceramic layer 13, so stress that extends the ceramic layer 13 in the plane direction is applied to the ceramic layer 13. When such stress is applied, if the ceramic layer 13 has vertical cracks extending in the thickness direction thereof, the stress acting on the ceramic layer 13 is reduced with extension of the vertical cracks, so that it is possible to suppress the occurrence of cracks in the plane direction which may cause delamination of the ceramic layer 13.

However, if vertical cracks are introduced in the ceramic layer 13, corrosive substances may infiltrate through the vertical cracks, deteriorating the ceramic layer 13.

Therefore, vertical cracks are introduced in the first layer 14 of the ceramic layer 13 while no vertical cracks are introduced in the second layer 15. In this case, it is possible to suppress infiltration of corrosive substances by the second layer 15 which has no vertical cracks.

However, when the first layer 14 has vertical cracks extending in the thickness direction thereof, the spacing of gaps of the vertical cracks in the first layer 14 expands with heating of the thermal barrier coating layer 10 and the heat resistant substrate 11, so stress that extends the second layer 15 in the plane direction is applied to the second layer 15 having no vertical cracks. Accordingly, when the porosity of the second layer 15 having no vertical cracks is less than 4.0%, cracks may easily occur in the second layer 15 due to thermal expansion of the first layer 14, and corrosive substances may infiltrate through the cracks formed in the second layer 15. Thus, it is difficult to set the porosity of the second layer 15 to less than 4.0%. However, it is desirable to reduce the porosity of the second layer 15 in terms of suppressing infiltration of corrosive substances.

In view of this, in the thermal barrier coating layer 10 according to an embodiment, vertical cracks extending in the thickness direction are not introduced in the first layer 14 and the second layer 15, and the porosity of the second layer 15 is set to 0.5% or more and less than 4.0%.

With this configuration, since the dimensional change due to thermal expansion of the first layer 14 is suppressed compared with the case where the first layer 14 has vertical cracks, it is possible to reduce the occurrence of cracks in the second layer 15 even when the porosity of the second layer 15 is less than 4.0%. Consequently, since the porosity of the second layer 15 can be reduced while suppressing the occurrence of cracks in the second layer 15, it is possible to improve the effect of suppressing infiltration of corrosive substances by the second layer 15.

(Method for Forming First Layer 14 and Second Layer 15)

In the thermal barrier coating layer 10 according to some embodiments, the first layer 14 and the second layer 15 are thermal spray layers formed by atmospheric plasma spraying.

For instance, when the first layer 14 and the second layer 15 are formed by chemical vapor deposition or physical vapor deposition, or when the first layer 14 and the second layer 15 are formed by low pressure plasma spraying, a large apparatus equipped with a chamber is required, so that the equipment cost becomes expensive, and further, these methods require many steps including preparation, for example, setup.

In this regard, in the thermal barrier coating layer 10 according to some embodiments, since the first layer 14 and the second layer 15 are formed by atmospheric plasma spraying with a simple apparatus configuration, it is possible to reduce the equipment cost and the number of steps including preparation such as setup and shorten the time necessary for steps, compared with the case where the first layer 14 and the second layer 15 are formed by, for example, chemical vapor deposition, physical vapor deposition, or low pressure plasma spraying.

(Spray Particles Used for Forming Second Layer 15)

Figure 2:
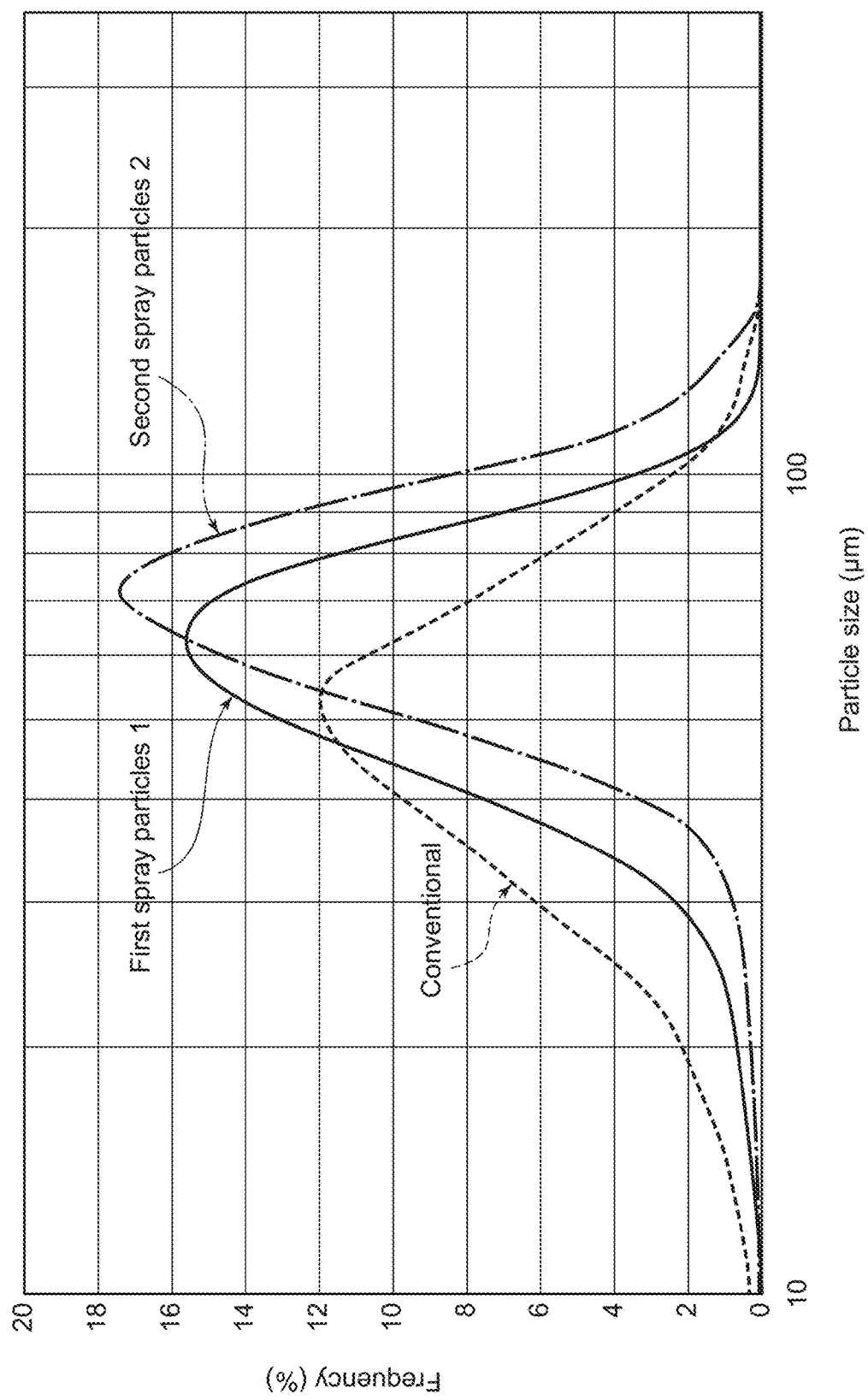
FIG. 2 is an exemplary graph representing particle size distribution of spray particles by frequency distribution.
Figure 3:
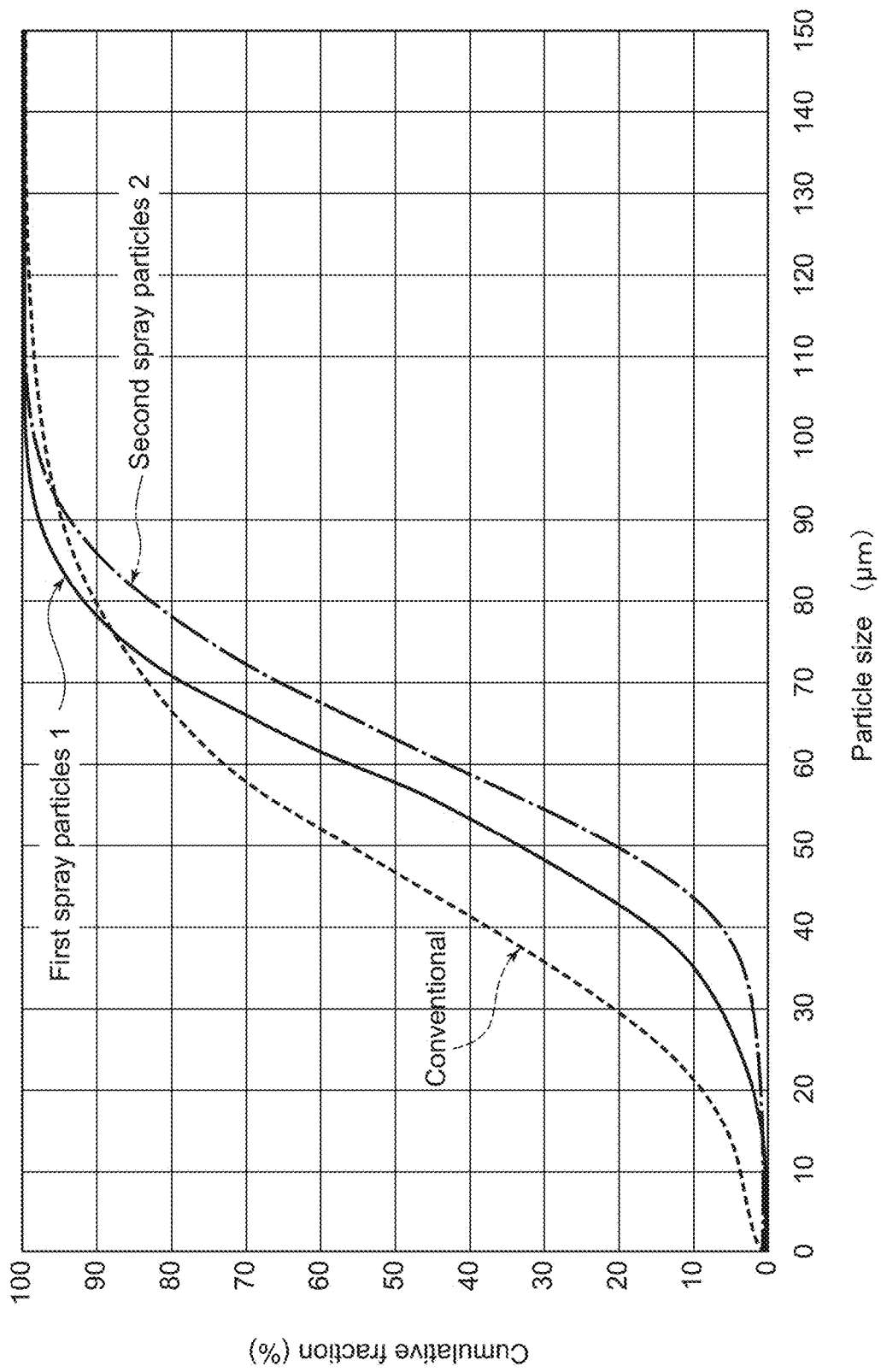
FIG. 3 is a graph representing particle size distribution of spray particles shown in FIG. 2 by cumulative distribution.
Figure 4A:
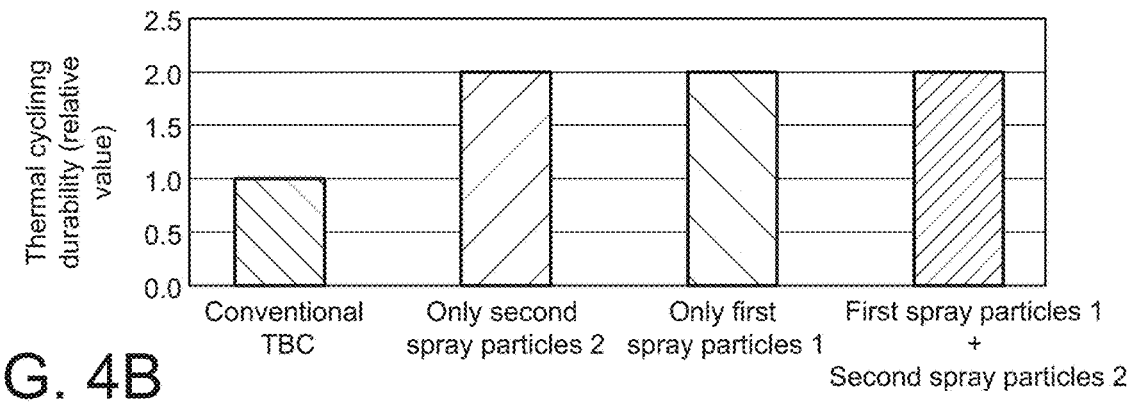
FIG. 4A is a diagram showing a difference in property of ceramic layers with different spray particles, with respect to thermal cycling durability.
Figure 4B:
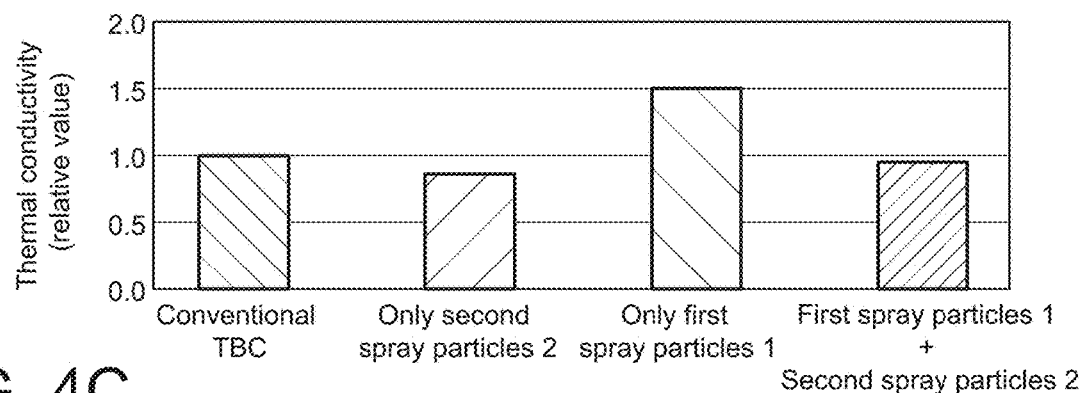
FIG. 4B is a diagram showing a difference in property of ceramic layers with different spray particles, with respect to thermal conductivity.
Figure 4C:
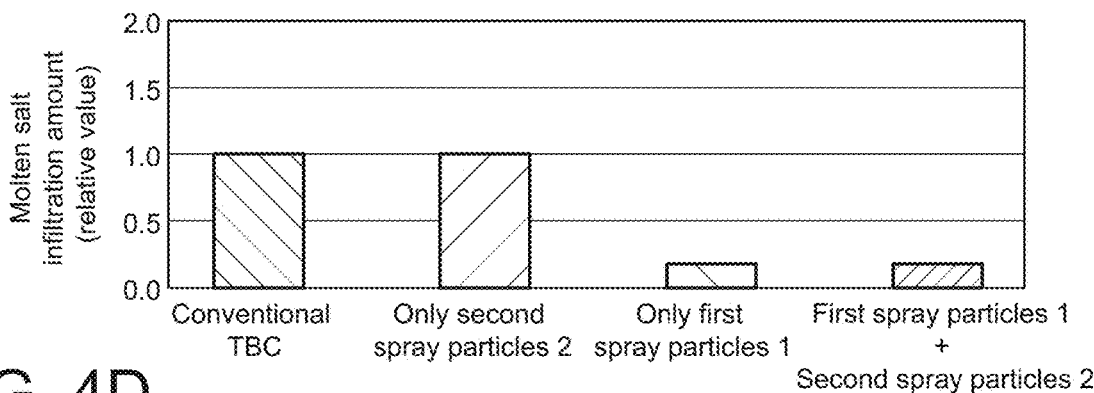
FIG. 4C is a diagram showing a difference in property of ceramic layers with different spray particles, with respect to infiltration amount of molten salt as corrosive substance into a ceramic layer.
Figure 4D:
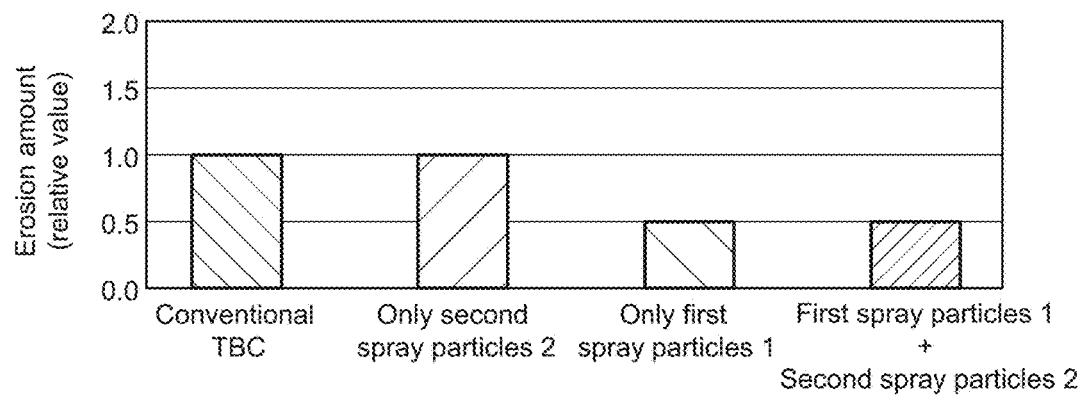
FIG. 4D is a diagram showing a difference in property of ceramic layers with different spray particles, with respect to erosion amount.

FIG. 2 is an exemplary graph representing particle size distribution of spray particles used for forming the first layer 14 and the second layer 15 according to some embodiments by frequency distribution. FIG. 3 is a graph representing particle size distribution of spray particles shown in FIG. 2 by cumulative distribution.

Conventionally, a ceramic layer is formed by using spray particles having a particle size distribution close to normal distribution with an average particle size ranging from 10 μm to 150 μm, generally 10 μm to 100 μm. In FIGS. 2 and 3, the particle size distribution of spray particles used for forming a conventional ceramic layer is represented by the dashed line.

As a result of intensive studies, the present inventors have found that when the ceramic layer is formed by using spray particles which contains small-size particles at a smaller proportion than in spray particles used for forming the conventional ceramic layer and mainly contains relatively large particles, the porosity of the ceramic layer increases, so that the thermal barrier property of the ceramic layer is improved. Further, the present inventors have found that when the ceramic layer is formed by using spray particles containing small-size particles at a smaller proportion than in spray particles used for forming the conventional ceramic layer and mainly containing relatively large particles, the occurrence of micro-defects (lamellar defects) which may expand starting from pores is suppressed, so that the thermal cycling durability is improved.

More specifically, the present inventors have found that when D10 particle size is increased compared with spray particles used for forming the conventional ceramic layer to reduce the proportion of small-size particles in the spray particles, the thermal barrier property of the ceramic layer and the thermal cycling durability are improved.

Further, as a result of intensive studies, the present inventors have found that when the proportion of large-size particles in the above-described spray particles, which contains small-size particles at a smaller proportion than in spray particles used for forming the conventional ceramic layer and mainly contains relatively large particles, is further reduced, the porosity of the ceramic layer is reduced while ensuring the thermal cycling durability.

More specifically, as a result of intensive studies, the present inventors have found that when first spray particles 1 having a particle size distribution, for example, with a D10 particle size of 30 μm or more and 40 μm or less, a D50 particle size of 40 μm or more and 60 μm or less, and a D90 particle size of 70 μm or more and 80 μm or less are used for forming the second layer 15, the porosity of the second layer 15 is reduced, so that infiltration of corrosive substances is suppressed. Further, they have found that, using the first spray particles 1, the occurrence of micro-defects (lamellar defects) which may expand starting from pores in the second layer 15 is suppressed, so that the thermal cycling durability is improved. That is, when the first spray particles 1 are used, the porosity of the second layer 15 can be 0.5% or less and 9.0 or less.

Thus, when the second layer 15 is formed by thermally spraying the first spray particles 1, it is possible to suppress infiltration of corrosive substances by the second layer 15 while ensuing the durability of the second layer 15.

FIGS. 2 and 3 show an example of the particle size distribution of the first spray particles 1 with a D10 particle size of 30 μm or more and 40 μm or less, a D50 particle size of 40 μm or more and 60 μm or less, and a D90 particle size of 70 μm or more and 80 μm or less.

(Spray Particles Used for Forming First Layer 14)

As described above, as a result of intensive studies, the present inventors have found that when the ceramic layer is formed by using spray particles containing small-size particles at a smaller proportion than in spray particles used for forming the conventional ceramic layer and mainly containing relatively large particles, the porosity of the ceramic layer increases, so that the thermal barrier property of the ceramic layer is improved, and further, the occurrence of lamellar defects is suppressed, so that the thermal cycling durability is improved.

More specifically, as a result of intensive studies, the present inventors have found that when second spray particles 2 having a particle size distribution, for example, with a D10 particle size of 40 µm or more and 50 µm or less, a D50 particle size of 60 µm or more and 70 µm or less, and a D90 particle size of 80 µm or more and 100 µm or less are used for forming the first layer 14, the thermal cycling durability of the first layer 14 is improved. In other words, when the second spray particles 2 are used, the porosity of the first layer 14 can be 10% or less and 15% or less, so that it is possible to improve the thermal barrier property of the first layer 14 while ensuring the durability of the first layer 14.

FIGS. 2 and 3 show an example of the particle size distribution of the second spray particles 2 with a D10 particle size of 40 µm or more and 50 µm or less, a D50 particle size of 60 µm or more and 70 µm or less, and a D90 particle size of 80 µm or more and 100 µm or less.

FIG. 4 are diagrams showing differences in properties of ceramic layers 13 with different spray particles. FIG. 4A is a diagram showing thermal cycling durability. FIG. 4B is a diagram showing thermal conductivity. FIG. 4C is a diagram showing infiltration amount of molten salt as corrosive substance into the ceramic layer 13. FIG. 4D is a diagram showing erosion amount. The values shown in FIGS. 4A to 4D are relative values when the characteristic values of a conventional ceramic layer formed by thermally spraying spray particles for the conventional ceramic layer having the particle size distribution shown in FIG. 3 is expressed as 1.

In FIGS. 4A to 4D, the conventional ceramic layer formed by thermally spraying spray particles for the conventional ceramic layer having the particle size distribution shown in FIG. 3 is denoted as "conventional TBC". Similarly, a single ceramic layer formed only by the first spray particles 1 having the particle size distribution shown in FIG. 3 is denoted as "only first spray particles 1", and a single ceramic layer formed only by the second spray particles 2 having the particle size distribution shown in FIG. 3 is denoted as "only second spray particles 2". Further, the ceramic layer 13 including the second layer 15 formed by the first spray particles 1 having the particle size distribution shown in FIG. 3 and the first layer 14 formed by the second spray particles 2 having the particle size distribution shown in FIG. 3 is denoted as "first spray particles 1+second spray particles 2".

As shown in FIGS. 4A to 4D, the single ceramic layer formed only by the second spray particles 2, in which the proportion of small-size particles in the spray particles is reduced, has improved thermal cycling durability and substantially equal thermal conductivity, compared with the conventional ceramic layer formed by the spray particles for the conventional ceramic layer. Further, the single ceramic layer formed only by the second spray particles 2 has equal molten salt infiltration amount and erosion amount to the conventional ceramic layer formed by the spray particles for the conventional ceramic layer.

The single ceramic layer formed only by the first spray particles 1, in which the proportions of small-size particles and large-size particles in the spray particles are both reduced, has improved thermal cycling durability and reduced molten salt infiltration amount and erosion amount, compared with the conventional ceramic layer formed by the spray particles for the conventional ceramic layer. However, the single ceramic layer formed only by the first spray particles 1 has increased thermal conductivity due to the decrease in porosity, compared with the conventional ceramic layer formed by the spray particles for the conventional ceramic layer.

In contrast, the ceramic layer 13 including the second layer 15 formed by the first spray particles 1 and the first layer 14 formed by the second spray particles 2 has improved thermal conductivity, substantially equal thermal conductivity, and reduced molten salt infiltration amount and erosion amount, compared with the conventional ceramic layer formed by the spray particles for the conventional ceramic layer.

That is, the ceramic layer 13 including the second layer 15 formed by the first spray particles 1 and the first layer 14 formed by the second spray particles 2 has excellent characteristics in thermal cycling durability, thermal conductivity, and molten salt infiltration amount and erosion amount, compared with the conventional ceramic layer formed by the spray particles for the conventional ceramic layer.

(First Spray Particles 1 and Second Spray Particles According to Another Embodiment)

As a result of intensive studies by the present inventors, they have found that the thermal cycling durability of the layer formed by thermal spraying is improved by increasing D10 particle size, as described above. In other words, it has been found that the thermal cycling durability of the layer formed by thermal spraying is reduced by decreasing D10 particle size. Further, as a result of intensive studies by the present inventors, they have found that the porosity of the layer formed by thermal spraying is reduced by decreasing the proportion of large-size particles in the spray particles, as described above.

Thus, it is preferred that while preventing the D10 particle size of the first spray particles 1 from becoming too small relative to the D10 particle size of the second spray particles 2 in view of thermal cycling durability, the D50 particle size and D90 particle size of the first spray particles 1 are reduced relative to the D50 particle size and D90 particle size of the second spray particles 2 in view of corrosive substance infiltration suppression by the second layer 15.

Therefore, for example, as with first spray particles 1A shown in FIG. 5 described later, preferably, the ratio of the D10 particle size of the first spray particles 1A to the D10 particle size of the second spray particles 2 is larger than the ratio of the D50 particle size of the first spray particles 1A to the D50 particle size of the second spray particles 2 and the ratio of the D90 particle size of the first spray particles 1A to the D90 particle size of the second spray particles 2.

Figure 5:
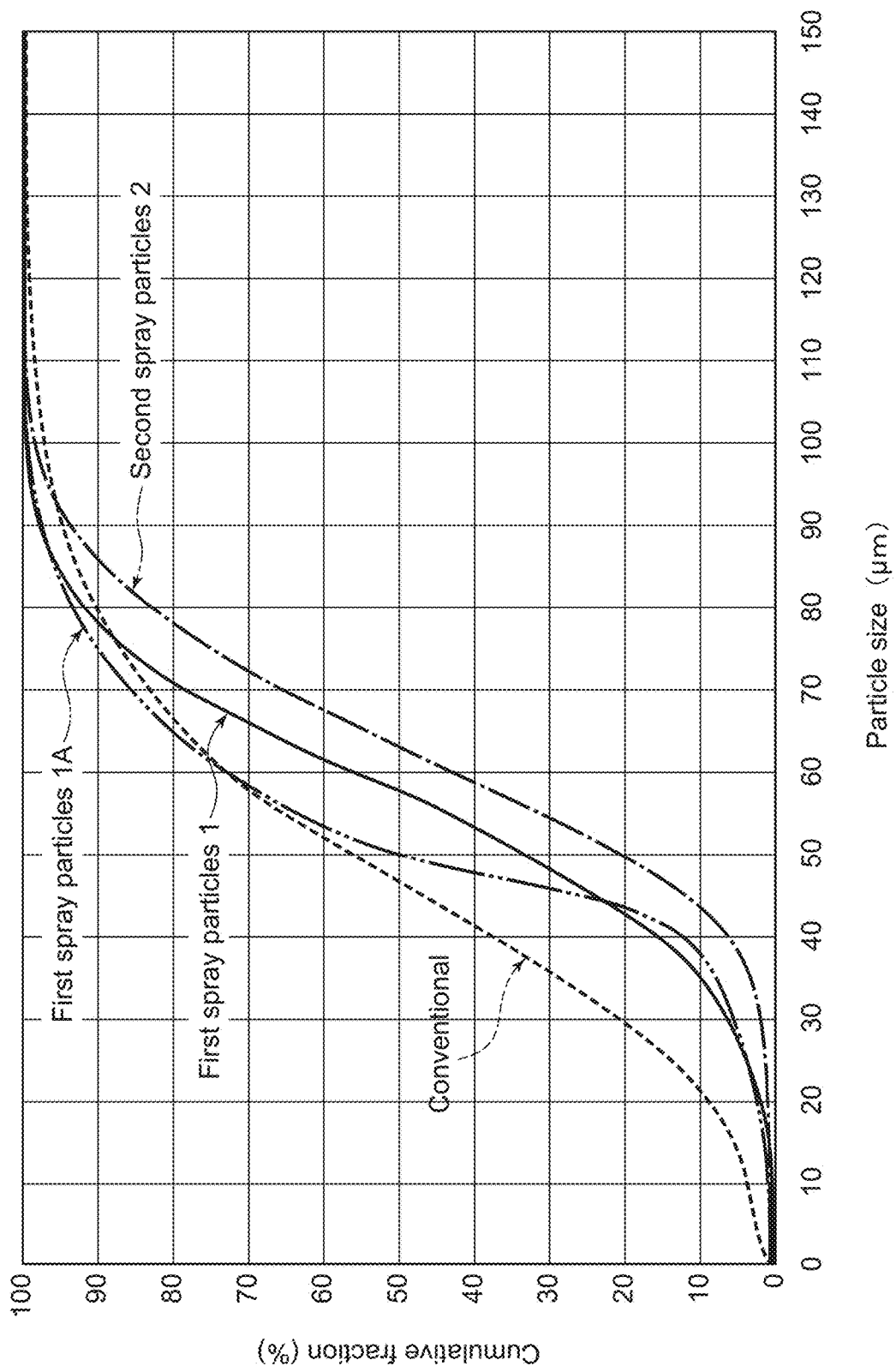
FIG. 5 is a graph representing particle size distribution of spray particles by cumulative distribution.

FIG. 5 is a graph representing particle size distribution of spray particles by cumulative distribution shown in FIG. 3 with particle size distribution of first spray particles 1A, which is different from the particle size distribution of the first spray particles 1 shown in FIG. 3.

For example, in the first spray particles 1A shown in FIG. 5, D10 particle size is slightly larger, and D50 particle size and D90 particle size are smaller than those in the first spray particles 1.

In the first spray particles 1A shown in FIG. 5, D10 particle size is, for example, 38 µm, D50 particle size is, for example, 50 µm, and D90 particle size is, for example, 75 µm.

Further, in the second spray particles 2 shown in FIG. 5, D10 particle size is, for example, 42 D50 particle size is, for example, 63 µm, and D90 particle size is, for example, 86 µm.

That is, comparing the first spray particles 1A and the second spray particles 2 shown in FIG. 5, the ratio of the D10 particle size of the first spray particles 1A to the D10 particle size of the second spray particles 2 (38 μm/42 μm=0.905) is larger than the ratio of the D50 particle size of the first spray particles 1A to the D50 particle size of the second spray particles 2 (50 μm/63 μm=0.794) and the ratio of the D90 particle size of the first spray particles 1A to the D90 particle size of the second spray particles 2 (75 μm/86 μm=0.872).

Thus, when the ratio of the D10 particle size of the first spray particles 1A to the D10 particle size of the second spray particles 2 is larger than the ratio of the D50 particle size of the first spray particles 1A to the D50 particle size of the second spray particles 2 and the ratio of the D90 particle size of the first spray particles 1A to the D90 particle size of the second spray particles 2, it is possible to suppress infiltration of corrosive substances by the second layer 15 while ensuring the durability of the second layer 15.

(Thickness of First Layer 14 and Second Layer 15)

The thicknesses of the first layer 14 and the second layer 15 are preferably 30 μm or more to achieve stable films in the case where the layers are formed by atmospheric plasma spraying, for example.

When the thickness of the second layer 15 is less than 50 the presence of locally thin portion may cause penetration of pores in the second layer 15. Accordingly, the thickness of the second layer 15 is preferably 50 μm or more in terms of corrosive substance filtration suppression.

Further, when the thickness of the second layer 15 exceeds 100 μm, the thermal cycling durability of the entire ceramic layer 13 may decrease. Accordingly, the thickness of the second layer 15 is preferably 100 μm or less.

When the thickness of the second layer 15 is less than 10% of the thickness of the first layer 14, for instance, the thickness of the second layer 15 is less than 0.05 mm (50 μm) when the thickness of the first layer 14 is 0.5 mm. This may cause penetration of pores in the second layer 15, as described above. On the other hand, when the thickness of the second layer 15 exceeds 100% of the thickness of the first layer 14, since the second layer 15 has a smaller porosity and thus a higher thermal conductivity than the first layer 14, the thermal barrier property of the ceramic layer 13 may become insufficient.

Accordingly, the thickness of the second layer 15 is preferably 10% or more and 100% or less of the thickness of the first layer 14.

When the thickness of the second layer 15 is 10% or more and 100% or less of the thickness of the first layer 14, it is possible to suppress infiltration of corrosive substances while ensuring the thermal barrier property.

As described above, the thickness of the second layer 15 is preferably 50 μm or more and 100 μm or less, and 10% or more and 100% or less of the thickness of the first layer 14. Accordingly, the possible lower limit value of the thickness of the first layer 14 is preferably 50 μm, as the lower limit value of the thickness of the second layer 15 is 50 μm when it is 100% of the thickness of the first layer 14. Similarly, the possible upper limit value of the thickness of the first layer 14 is preferably 1000 μm, as the upper limit value of the thickness of the second layer 15 is 100 μm when it is 10% of the thickness of the first layer 14.

For instance, when the thickness of the ceramic layer 13 is 0.5 mm and the thickness of the second layer 15 is its lower limit value, i.e., 50 μm, the thickness of the first layer 14 is 450 μm. In this case, the thickness of the second layer 15 is 11.1% of the thickness of the first layer 14. Meanwhile, when the thickness of the ceramic layer 13 is 0.5 mm and the thickness of the second layer 15 is its upper limit value, i.e., 100 μm, the thickness of the first layer 14 is 400 μm. In this case, the thickness of the second layer 15 is 25% of the thickness of the first layer 14.

(Method for Producing Thermal Barrier Coating)

Figure 6:
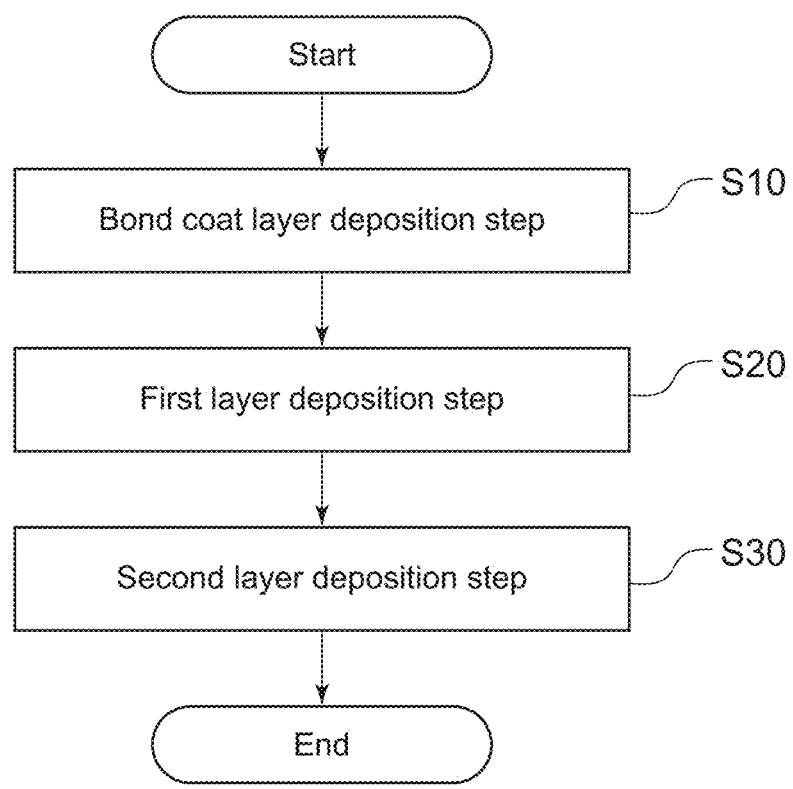
FIG. 6 is a flowchart of a method for producing a thermal barrier coating according to some embodiments.

Next, with reference to FIG. 6, a method for producing a thermal barrier coating according to some embodiments will be described. FIG. 6 is a flowchart of a method for producing a thermal barrier coating according to some embodiments.

The method for producing a thermal barrier coating according to some embodiments includes a bond coat layer deposition step S10, a first layer deposition step S20, and a second layer deposition step S30.

The bond coat layer deposition step S10 is a step of depositing the bond coat layer 12 on the heat resistant substrate 11. In the bond coat layer deposition step S10, spray powder, for example, MCrAlY alloy described above, is thermally sprayed onto the surface of the heat resistant substrate 11 to form the bond coat layer 12.

The first layer deposition step S20 is a step of depositing the first layer 14 on the bond coat layer 12 by thermally spraying spray particles. In the first layer deposition step S20, for example, the second spray particles 2 having a particle size distribution with a D10 particle size of 40 μm or more and 50 μm or less, a D50 particle size of 60 μm or more and 70 μm or less, and a D90 particle size of 80 μm or more and 100 μm or less are thermally sprayed onto the surface of the bond coat layer 12 by atmospheric plasma spraying to form the first layer 14.

The second layer deposition step S30 is a step of depositing the second layer 15 on the first layer 14 by thermally spraying spray particles. In the second layer deposition step S30, for example, the first spray particles 1 having a particle size distribution with a D10 particle size of 30 μm or more and 40 μm or less, a D50 particle size of 40 μm or more and 60 μm or less, and a D90 particle size of 70 μm or more and 80 μm or less are thermally sprayed onto the surface of the first layer 14 by atmospheric plasma spraying to form the second layer 15.

In the method for producing a thermal barrier coating according to some embodiments, the first layer 14 having a porosity of 10% or more and 15% or less can be formed on the bond coat layer 12. Thus, it is possible to suppress an increase in thermal conductivity of the first layer 14 while ensuring the durability of the first layer 14.

Further, in the method for producing a thermal barrier coating according to some embodiments, the second layer 15 having a porosity of 0.5% or more and 9.0% or less can be formed on the first layer 14. Thus, it is possible to suppress infiltration of corrosive substances by the second layer 15.

Thus, the method for producing a thermal barrier coating layer according to some embodiments can improve the durability of the thermal barrier coating layer 10 even in an environment where the combustion gas contains corrosive substances.

(Turbine Member and Gas Turbine)

The thermal barrier coating according to some embodiments described above can be usefully applied to rotor blades and stator vanes of industrial gas turbines, or hot parts such as a combustor, a combustor basket, a transition piece, and a ring segment. Further, it can be applied not only to industrial gas turbines, but also to thermal barrier coating films for hot parts of engines of automobiles and jets. By forming the thermal barrier coating according to the above-described embodiments on these structures, it is possible to obtain gas turbine blades and hot parts excellent in corrosion resistance and thermal cycling durability.

Figure 7:
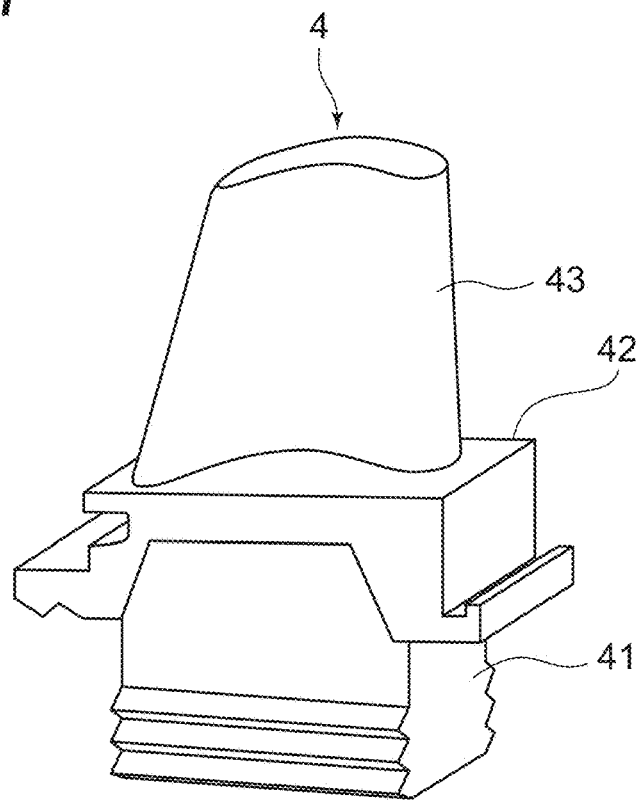
FIG. 7 is a perspective diagram showing a configuration example of a gas turbine rotor blade.
Figure 8:
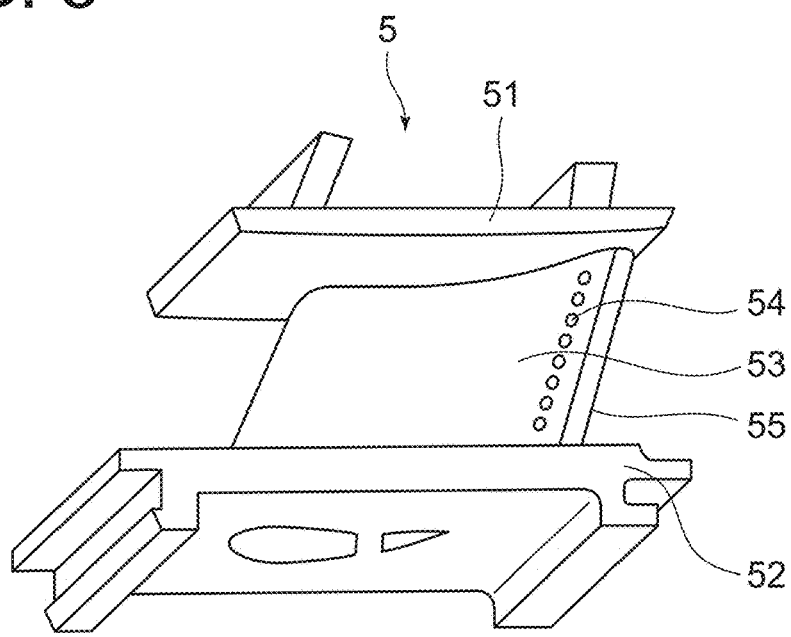
FIG. 8 is a perspective diagram showing a configuration example of a gas turbine stator vane.
Figure 9:
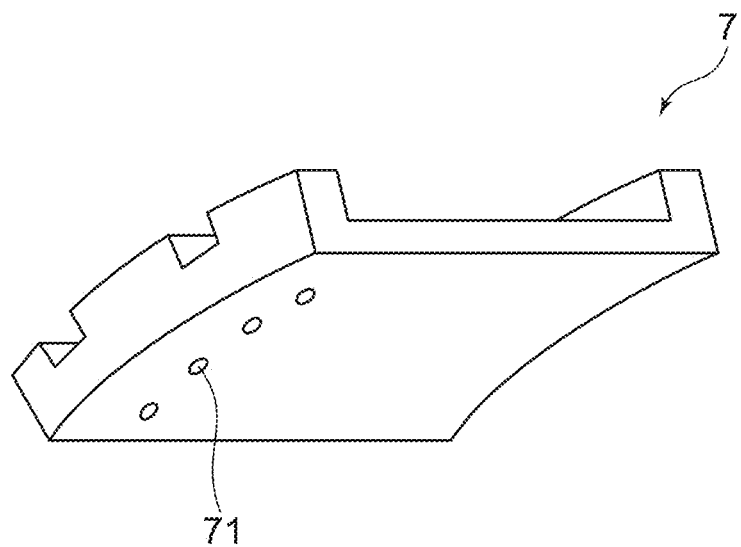
FIG. 9 is a perspective diagram showing a configuration example of a ring segment.
Figure 10:
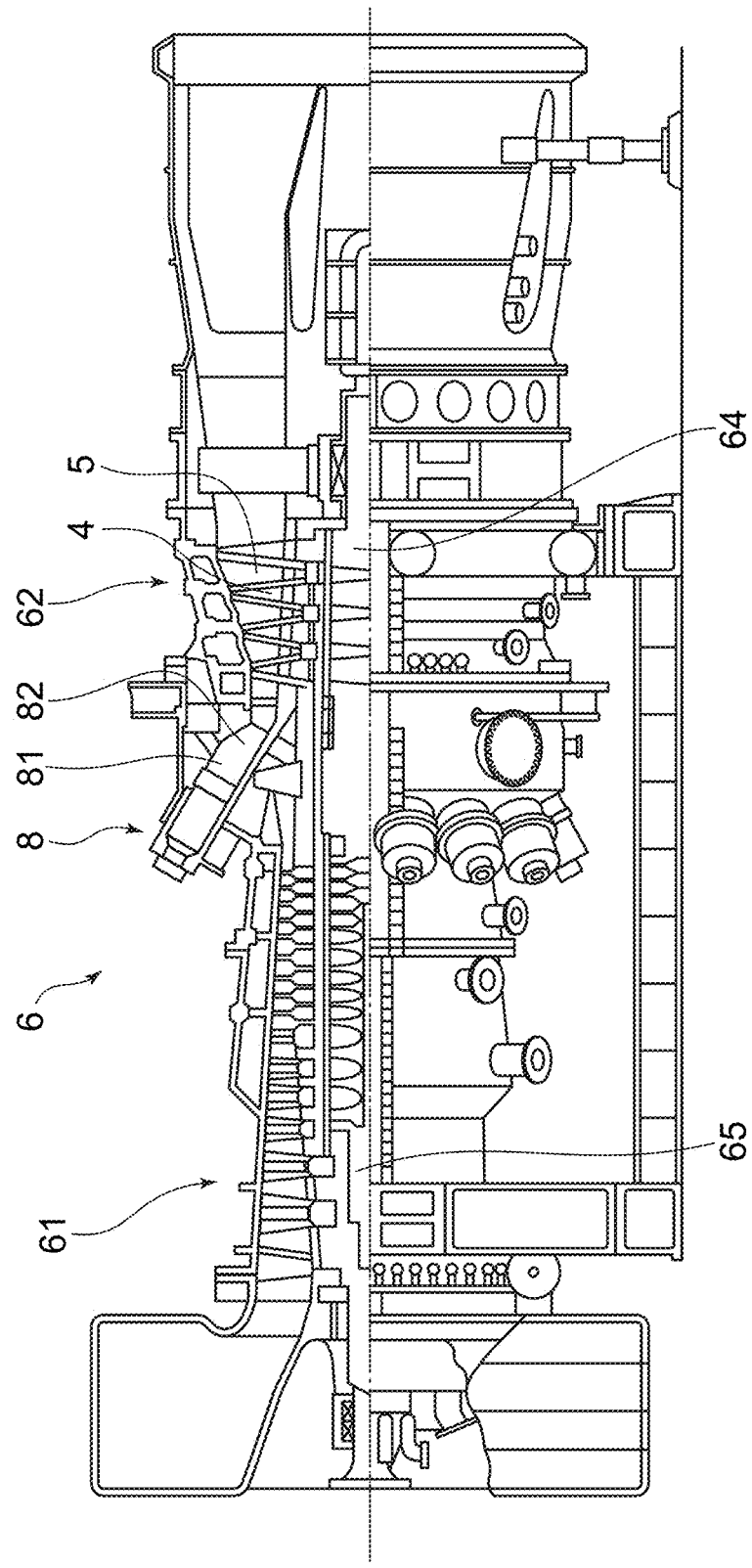
FIG. 10 is a schematic partial cross-sectional view of a gas turbine according to an embodiment.

FIGS. 7 to 9 are perspective views of examples of a turbine member to which the thermal barrier coating according to the above-described embodiments can be applied. FIG. 10 is a schematic partial cross-sectional view of a gas turbine 6 according to an embodiment. As configuration examples of the turbine member to which the thermal barrier coating according to the above-described embodiments can be applied, there may be mentioned a gas turbine rotor blade 4 shown in FIG. 7, a gas turbine stator vane 5 shown in FIG. 8, a ring segment 7 shown in FIG. 9, and a combustor 8 of a gas turbine 6 shown in FIG. 10. The gas turbine rotor blade 4 shown in FIG. 7 includes a dovetail 41 fixed to the disk, a platform 42, and an airfoil portion 43. The gas turbine stator vane 5 shown in FIG. 8 includes an inner shroud 51, an outer shroud 52, and an airfoil portion 53. The airfoil portion 53 has seal fin cooling holes 54 and a slit 55.

The ring segment 7 shown in FIG. 9 is a member formed by dividing an annular member in the circumferential direction. Multiple ring segments 7 are disposed outside the gas turbine rotor blades 4 and held by a casing of a turbine 62. The ring segment 7 shown in FIG. 9 has cooling holes 71. The combustor 8 of the gas turbine 6 shown in FIG. 10 includes a combustor basket 81 and a transition piece 82 as a liner.

Next, with reference to FIG. 10, a gas turbine to which the above-described turbine member can be applied will be described. FIG. 10 is a schematic partial cross-sectional view of a gas turbine according to an embodiment. The gas turbine 6 includes a compressor 61 and a turbine 62 directly connected to each other. The compressor 61 is configured, for example, as an axial flow compressor, which sucks the atmospheric air or a predetermined gas from a suction port as a working fluid and pressurizes the gas. A discharge port of the compressor 61 is connected to the combustor 8, and the working fluid discharged from the compressor 61 is heated by the combustor 8 to a predetermined turbine inlet temperature. The working fluid heated to the predetermined temperature is supplied to the turbine 62. As shown in FIG. 10, the casing of the turbine 62 contains multiple stages of the above-described gas turbine stator vanes 5. Further, the above-described gas turbine rotor blades 4 are attached to a main shaft 64 so that each forms a single stage with the corresponding rotor blade 4. One end of the main shaft 64 is connected to a rotational shaft 65 of the compressor 61, and the other end is connected to a rotational shaft of a generator not depicted.

With this configuration, as a working fluid at high temperature and high pressure is supplied from the combustor 8 into the casing of the turbine 62, the working fluid expands in the casing and rotates the main shaft 64, consequently driving the generator (not shown) connected to the gas turbine 6. Specifically, the pressure is reduced by each stator vane 5 fixed to the casing, and the resulting kinetic energy is converted to rotational torque via each rotor blade 4 attached to the main shaft 64. Then, the generated rotational torque is transmitted to the main shaft 64 and drives the generator.

Generally, the material used for gas turbine rotor blades is heat resistant alloy (e.g., IN738LC, commercial alloy material manufactured by Inco), and the material used for gas turbine stator vanes is also heat-resistant alloy (e.g., IN939, commercial alloy material manufactured by Inco). That is, the material of turbine blade and vanes is heat resistant alloy that can be used as the heat resistant substrate 11 of the thermal barrier coating according to the above-described embodiments. Therefore, by applying the thermal barrier coating according to the above-described embodiments to turbine blades and vanes, it is possible to obtain turbine blades and vanes excellent in thermal barrier effect, erosion resistance, and durability. Such turbine blades and vanes can be used in a higher temperature environment, with a long lifetime. Further, the applicability in higher temperature environment allows the working fluid to be heated, so that the gas turbine efficiency can be improved.

Thus, since the turbine blades and vanes 4, 5 according to some embodiments has the thermal barrier coating according to the above-described embodiment, it is possible to improve the durability of the turbine member even in an environment where the combustion gas contains corrosive substances.

Further, since the gas turbine 6 according to some embodiments includes the gas turbine blades or vanes 4, 5, as the turbine member, it is possible to improve the durability of the turbine member of the gas turbine 6 even in an environment where the combustion gas contains corrosive substances.

The present invention is not limited to the embodiments described above, but includes modifications to the embodiments described above, and embodiments composed of combinations of those embodiments.

For instance, the method for producing a thermal barrier coating according to the above-described embodiments includes the bond coat layer deposition step S10, the first layer deposition step S20, and the second layer deposition step S30. However, with respect to the heat resistant substrate 11 on which the bond coat layer 12 and the first layer have been already formed, the second layer 15 may be formed on the surface of the first layer 14 in the second layer deposition step S30.

Thus, for instance, the second layer 15 can be formed on a conventional turbine member having a layer equivalent to the first layer 14.

Figure 11:
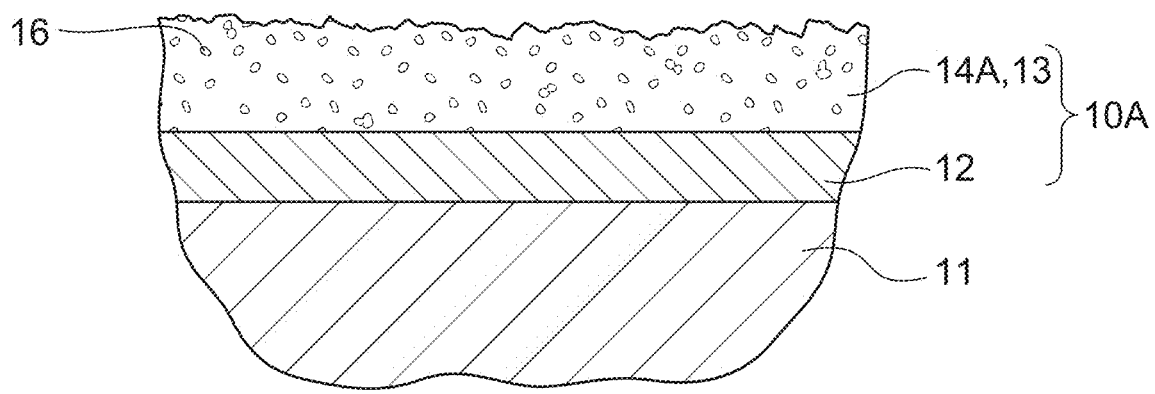
FIG. 11 is a schematic cross-sectional view of a turbine member having an existing coating layer.
Figure 12:
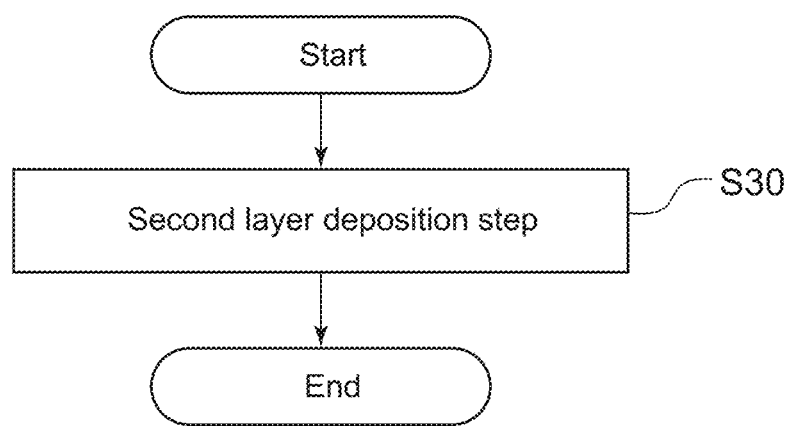
FIG. 12 is a flowchart of a method for producing a thermal barrier coating in which a second layer is formed on an existing coating layer.

Specifically, for example as shown in FIG. 11, in the process of producing a thermal barrier coating shown in FIG. 12, the second layer 15 may be formed on an existing coating layer 10A including the bond coat layer 12 and a first layer 14A equivalent to the first layer 14 which are deposited on the substrate 11. FIG. 11 is a schematic cross-sectional view of a turbine member having an existing coating layer 10A with a deposited first layer 14A equivalent to the first layer 14. FIG. 12 is a flowchart of the method for producing a thermal barrier coating in which the second layer 15 is formed on the existing coating layer 10A.

The method for producing a thermal barrier coating shown in FIG. 12 includes a second layer deposition step S30. The second layer deposition step S30 according to the embodiment shown in FIG. 12 is the same as the second layer deposition step S30 according to the above-described embodiments shown in FIG. 6.

In the method for producing a thermal barrier coating according to the embodiment shown in FIG. 12, in the second layer deposition step S30, the second layer 15 is formed on the surface of the first layer 14A of, for example, a turbine member used for operation of the gas turbine 6 on which the second layer 15 is not formed, or an unused turbine member on which the second layer 15 is not formed.

With this method, the second layer 15 having a porosity of 0.5% or more and 9.0% or less is formed on the existing coating layer 10A having the bond coat layer 12 and the first layer 14A deposited on the bond coat layer 12 by the second layer deposition step S30. Thus, it is possible to suppress infiltration of corrosive substances by the second layer 15.

Therefore, the durability of the existing coating layer 10A can be improved even in an environment where the combustion gas contains corrosive substances.

The method for producing a thermal barrier coating according to the above-described embodiments includes the bond coat layer deposition step S10, the first layer deposition step S20, and the second layer deposition step S30. However, when a turbine member having the thermal barrier coating layer 10 according to the above-described embodiments is maintained, after removing an old second layer 15, a new second layer 15 may be formed.

Figure 13:
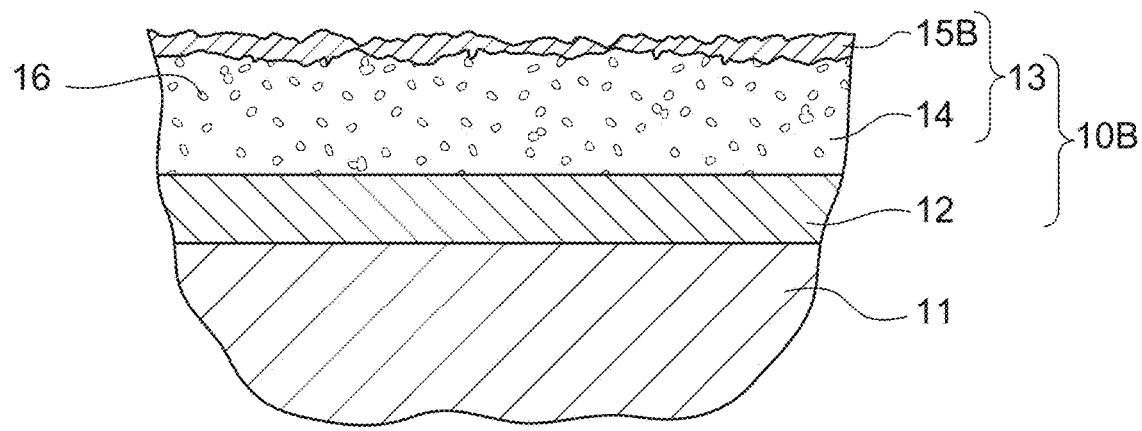
FIG. 13 is a schematic cross-sectional view of a turbine member having an existing thermal barrier coating layer.
Figure 14:
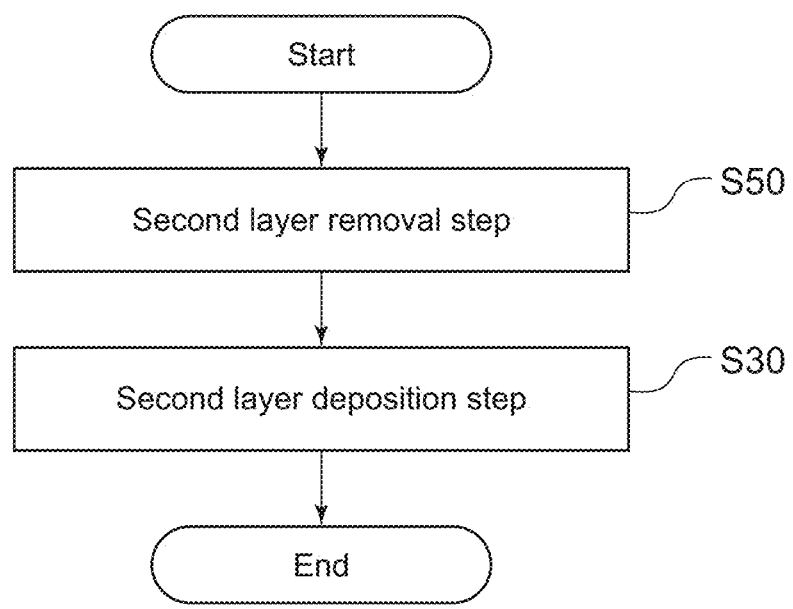
FIG. 14 is a flowchart of a method for producing a thermal barrier coating in which an old second layer of an existing thermal barrier coating layer is removed, and a new second layer is formed.

Specifically, for example as shown in FIG. 13, in the process of producing a thermal barrier coating shown in FIG. 14, an old second layer 15B may be removed from an existing thermal barrier coating layer 10B having the bond coat layer 12 deposited on the substrate 11, the first layer 14 deposited on the bond coat layer 12, and the second layer 15B deposited on the first layer 14, and a new second layer 15 may be formed instead. FIG. 13 is a schematic cross-sectional view of a turbine member having the existing thermal barrier coating layer 10B. FIG. 14 is a flowchart of the method for producing a thermal barrier coating in which the old second layer 15B of the existing thermal barrier coating layer 10B is removed, and the new second layer 15 is formed.

The method for producing a thermal barrier coating shown in FIG. 14 includes a second layer removal step S50 and a second layer deposition step S30. The second layer deposition step S30 according to the embodiment shown in FIG. 14 is the same as the second layer deposition step S30 according to the above-described embodiments shown in FIG. 6.

Figure 15:
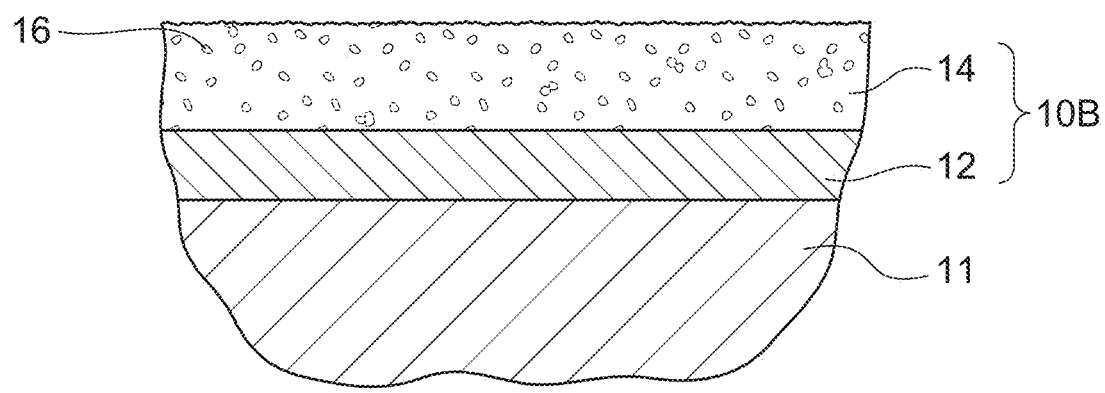
FIG. 15 is a schematic cross-sectional view of a turbine member after an old second layer is removed in a second layer removal step.

In the method for producing a thermal barrier coating shown in FIG. 14, first, the old second layer 15B of the existing thermal barrier coating layer 10B shown in FIG. 13 is removed in the second layer removal step S50. In the second layer removal step S50, the old second layer 15B may be removed, for example, by blasting. FIG. 15 is a schematic cross-sectional view of a turbine member after the old second layer 15B is removed in the second layer removal step S50.

Then, in the second layer deposition step S30, the second layer 15 is formed on the surface of the first layer 14 of the existing thermal barrier coating layer 10B from which the old second layer 15B has been removed in the second layer removal step S50.

Specifically, the method for producing a thermal barrier coating according to the embodiment shown in FIG. 14 includes the second layer removal step S50 of removing the second layer 15B from the existing thermal barrier coating layer 10B having the bond coat layer 12 deposited on the substrate 11, the first layer 14 deposited on the bond coat layer 12, and the second layer 15B deposited on the first layer 14. Further, the method for producing a thermal barrier coating according to the embodiment shown in FIG. 14 includes the second layer deposition step S30 of depositing the second layer 15, on the first layer 14 of the existing thermal barrier coating layer 10B from which the second layer 15B has been removed, by thermally spraying spray particles having a particle size distribution of the first spray particles 1 with a D10 particle size of 30 μm or more and 40 μm or less, a D50 particle size of 40 μm or more and 60 μm or less, and a D90 particle size of 70 μm or more and 80 μm or less.

With this method, the second layer 15B is removed from the existing thermal barrier coating layer 10B, and the second layer 15 having a porosity of 0.5% or more and 9.0% or less is newly formed. Thus, it is possible to newly deposit the second layer 15, for instance, when the second layer 15B of the existing thermal barrier coating layer 10B deteriorates. Thus, it is possible to suppress infiltration of corrosive substances by the newly deposited second layer 15. Therefore, the durability of the existing thermal barrier coating layer 10B can be improved even in an environment where the combustion gas contains corrosive substances.

REFERENCE SIGNS LIST 1, 1A First spray particle
2 Second spray particle
4 Gas turbine rotor blade
5 Gas turbine stator vane
6 Gas turbine
7 Ring segment
8 Combustor
10 Thermal barrier coating (TBC) layer
11 Heat resistant substrate (Substrate)
12 Metallic bond layer (Bond coat layer)
13 Ceramic layer
14 First layer
15 Second layer

The invention claimed is:

1. A thermal barrier coating comprising:
a bond coat layer deposited on a substrate; and
a ceramic layer deposited on the bond coat layer,
the ceramic layer including
a first layer having a porosity of 10% or more and 15% or less, and
a second layer having a porosity of 0.5% or more and less than 9.0%, and having a thickness of 50 μm or more and 100 μm or less, the second layer being deposited on the first layer,
wherein a thickness of the second layer is 10% or more and 100% or less of a thickness of the first layer,
wherein the first layer and the second layer are each composed of ytterbium-stabilized zirconia ("YbSZ"),
wherein the second layer is formed by thermally spraying first spray particles having a particle size distribution with a D10 particle size of 30 μm or more and 40 μm or less, a D50 particle size of 40 μm or more and 60 μm or less, and a D90 particle size of 70 μm or more and 80 μm or less,
wherein the first layer is formed by thermally spraying second spray particles having a particle size distribution with a D10 particle size of 40 μm or more and 50 μm or less, a D50 particle size of 60 μm or more and 70 μm or less, and a D90 particle size of 80 μm or more and 100 μm or less, and
wherein a ratio of the D10 particle size of the first spray particles to the D10 particle size of the second spray particles is larger than a ratio of the D50 particle size of the first spray particles to the D50 particle size of the second spray particles and a ratio of the D90 particle size of the first spray particles to the D90 particle size of the second spray particles.

2. The thermal barrier coating according to claim 1, wherein the first layer and the second layer are thermal spray layers formed by atmospheric plasma spraying.

3. A turbine member comprising the thermal barrier coating according to claim 1.

4. A gas turbine comprising the turbine member according to claim 3.

5. The thermal barrier coating according to claim 1, wherein the porosity of the second layer is 1.0% or more and 7.5% or less.

6. The thermal barrier coating according to claim 1, wherein the first layer has no vertical cracks extending along a thickness direction of the first layer, and
wherein the porosity of the second layer is 0.5% or more and less than 4.0%.

7. The thermal barrier coating according to claim 1, wherein the porosity of the second layer is 0.5% or more and less than 3.0%.

* * * * *